(12) United States Patent
Rozinov

(10) Patent No.: US 9,124,646 B2
(45) Date of Patent: Sep. 1, 2015

(54) METHOD AND SYSTEM FOR OBTAINING AVAILABILITY STATUS FOR MULTIPLE SIP USERS

(75) Inventor: Boris Rozinov, Richmond Hill (CA)

(73) Assignee: BLACKBERRY LIMITED, Waterloo (CA)

( * ) Notice: Subject to any disclaimer, the term of this patent is extended or adjusted under 35 U.S.C. 154(b) by 403 days.

(21) Appl. No.: 13/529,467

(22) Filed: Jun. 21, 2012

(65) Prior Publication Data

US 2013/0218992 A1    Aug. 22, 2013

Related U.S. Application Data

(60) Provisional application No. 61/599,701, filed on Feb. 16, 2012.

(51) Int. Cl.
```
G06F 15/16    (2006.01)
H04L 29/08    (2006.01)
H04L 29/06    (2006.01)
H04L 12/58    (2006.01)
```

(52) U.S. Cl.
CPC ............ *H04L 67/24* (2013.01); *H04L 12/5815* (2013.01); *H04L 65/1006* (2013.01)

(58) Field of Classification Search
None
See application file for complete search history.

(56) References Cited

U.S. PATENT DOCUMENTS

| | | | |
|---|---|---|---|
| 6,564,261 B1 * | 5/2003 | Gudjonsson et al. | 709/227 |
| 7,020,707 B2 * | 3/2006 | Sternagle | 709/230 |
| 7,742,421 B2 * | 6/2010 | Bantukul et al. | 370/236.1 |
| 8,316,104 B2 * | 11/2012 | Galvez et al. | 709/219 |
| 2004/0122896 A1 * | 6/2004 | Gourraud | 709/204 |
| 2006/0067244 A1 * | 3/2006 | Sekaran et al. | 370/252 |
| 2006/0280166 A1 * | 12/2006 | Morris | 370/352 |
| 2007/0083675 A1 * | 4/2007 | Vemulapelli et al. | 709/246 |
| 2007/0150941 A1 * | 6/2007 | Jachner | 726/5 |
| 2007/0260739 A1 * | 11/2007 | Buckley et al. | 709/230 |

(Continued)

FOREIGN PATENT DOCUMENTS

| | | |
|---|---|---|
| EP | 2239920 A1 | 10/2010 |
| WO | 2004034719 A1 | 4/2004 |

(Continued)

OTHER PUBLICATIONS

"Cisco Unified Presence" Cisco Unified Communication System 8.x SRND, Chapter 23, pp. 1-44, Jan. 12, 2012.

(Continued)

*Primary Examiner* — Hassan Kizou
*Assistant Examiner* — Phyllis A Book
(74) *Attorney, Agent, or Firm* — Todd A. Keeler; Borden Ladner Gervais LLP

(57) ABSTRACT

Systems and methods for obtaining availability status in respect of a plurality of user identifiers are provided. For each user identifier, a respective SIP cluster identifier is obtained. The user identifiers are then grouped according to SIP cluster identifier, each such group of user identifiers containing at least one user identifier for which the same SIP cluster identifier was obtained. For each SIP cluster identifier for which there is a group of user identifiers, a request is sent for availability status information in a single message to a SIP cluster associated with the SIP cluster identifier, the request containing the user identifiers of the group of user identifiers. A response to each single message is received in a single message containing availability status information for the user identifiers belonging to the group of user identifiers.

14 Claims, 3 Drawing Sheets

(56) References Cited

U.S. PATENT DOCUMENTS

| | | | |
|---|---|---|---|
| 2008/0077696 A1 | 3/2008 | Nguyen | |
| 2008/0195718 A1* | 8/2008 | Hu et al. | 709/207 |
| 2009/0049168 A1* | 2/2009 | Galvin et al. | 709/224 |
| 2009/0248799 A1* | 10/2009 | Gavita | 709/204 |
| 2010/0002682 A1* | 1/2010 | Shi et al. | 370/352 |
| 2010/0205263 A1* | 8/2010 | Langen et al. | 709/206 |
| 2011/0197058 A1* | 8/2011 | Mayer et al. | 713/150 |
| 2011/0252161 A1* | 10/2011 | Ranney | 709/248 |
| 2011/0295957 A1* | 12/2011 | Ananthanarayanan et al. | 709/206 |
| 2012/0096179 A1* | 4/2012 | Tombroff et al. | 709/230 |

FOREIGN PATENT DOCUMENTS

| | | |
|---|---|---|
| WO | 2005065234 A2 | 7/2005 |
| WO | 2007021444 A2 | 2/2007 |
| WO | 2007134305 A2 | 11/2007 |

OTHER PUBLICATIONS

"Session Initiation Protocol" Wikipedia.org, <http://en.wikipedia.org/wiki/Session_Initiation_Protocol>, printed Mar. 13, 2012.

Smith, Dylan A.H. et al., "Hierarchical Notification Dissemination for IMS Presence using Network Coordinates", In Proceedings of GLOBECOM. Jan. 5, 2010.

Rosenberg Jdrosen Net J; "Simple made Simple: An Overview of the IETF Specifications for Instant Messaging and Presence using the session Initiation Protocol (SIP); draft-ietf-simple-simple-06.txt", Internet Engineering Task Force, IETF; Standardworkingdraft, Internet Society, No. 6, Nov. 19, 2010, pp. 1-15, XP015072665.

Houri IBM E Aoki Aol LLC S Parameswar Microsoft Corporation A: "Presence and Instant Messaging Peering Use Cases; rfc5344.txt", Internet Engineering Task Force, IETF; Standard, Internet Society (ISOC) 4, Rue Des Falaises CH-1205 Geneva, Switzerland, Oct. 1, 2008, XP015060319.

Simple WG J Rosenberg Dynamicsoft B Campbell Dynamicsoft: "A SIP Event Package for List Presence; draft-ietf-simple-presencelist-package-00.txt", Jun. 24, 2002, vol. simple, Jun. 24, 2002, XP015027634.

* cited by examiner

METHOD AND SYSTEM FOR OBTAINING AVAILABILITY STATUS FOR MULTIPLE SIP USERS

RELATED APPLICATION

This application claims benefit from U.S. Provisional Patent Application No. 61/599,701 filed on Feb. 16, 2012, the disclosure of which is hereby incorporated by reference in its entirety.

FIELD

The disclosure relates to methods and systems for obtaining availability status for multiple session initiation protocol (SIP) users.

BACKGROUND

Numerous services require information regarding currently connected SIP users. For example, a SIP endpoint may be interested in the availability of each user on a contact list. Such a request is typically initially received by a SIP infrastructure node to which the SIP endpoint is connected. SIP infrastructure nodes may also be interested in obtaining this information.

SIP infrastructure may be composed of SIP clusters, a SIP cluster being a set of SIP nodes that are typically co-located. If all the users for which availability status is required are connected to the same SIP cluster as the requesting entity, then this information can be obtained from a binding repository local to the cluster to which all servers in the cluster have access.

When availability status is required for at least one user that is connected to a cluster other than that of the requesting entity, intercluster messaging is required. The SIP infrastructure node handling the request locates the respective serving cluster for each user from a user cluster information repository. The user cluster information repository indicates to which serving cluster the user was most recently connected, and is therefore possibly still connected. For each user having a serving cluster that is different from that of the SIP node handling the request, a respective request to the cluster of the user is made. As such, the number of required transactions may be as large as the number of users in the list assuming every user has only one device registered at external clusters. The number could be larger if some users have multiple devices registered at different clusters.

BRIEF DESCRIPTION OF THE DRAWINGS

Embodiments of the disclosure will now be described with reference to the attached drawings in which.

DETAILED DESCRIPTION

A broad aspect of the disclosure provides a method of obtaining availability status in respect of a plurality of user identifiers, the method comprising: for each user identifier of the plurality of user identifiers, obtaining a respective SIP cluster identifier; grouping the user identifiers into a plurality of groups of user identifiers according to SIP cluster identifier, each group of user identifiers containing at least one user identifier for which the same SIP cluster identifier was obtained; for each SIP cluster identifier for which there is a group of user identifiers: sending a request for availability status information in a single message to a SIP cluster associated with the SIP cluster identifier, the request containing the user identifiers of the group of user identifiers; receiving a response in a single message containing availability status information for the user identifiers belonging to the group of user identifiers.

Another broad aspect of the disclosure provides a system comprising: a plurality of SIP nodes that are interconnected with SIP connectivity, the plurality of nodes being arranged in at least two SIP clusters; for each SIP cluster, a local binding repository containing availability status information for each user identifier for which there is a SIP endpoint connected to a SIP node within the SIP cluster; for each SIP cluster, a respective multi-user availability status handler; a user cluster information repository indicating a respective SIP cluster identifier of a SIP cluster to which a SIP endpoint of each of a plurality of user identifiers is expected to be connected; wherein each availability status handler is configured to, in respect of obtaining availability status in respect of a plurality of user identifiers: for each user identifier of the plurality of user identifiers, obtain a respective SIP cluster identifier from the user cluster information repository; group the user identifiers into a plurality of groups of user identifiers according to SIP cluster identifier, each group of user identifiers contains at least one user identifier for which the same SIP cluster identifier was obtained; for each SIP cluster identifier for which there is a group of user identifiers: send a request for availability status information in a single message to the SIP cluster associated with the SIP cluster identifier, the request containing the user identifiers of the group of identifiers; receive a response in a single message containing availability status information for the user identifiers belonging to the group of user identifiers.

Figure 1:
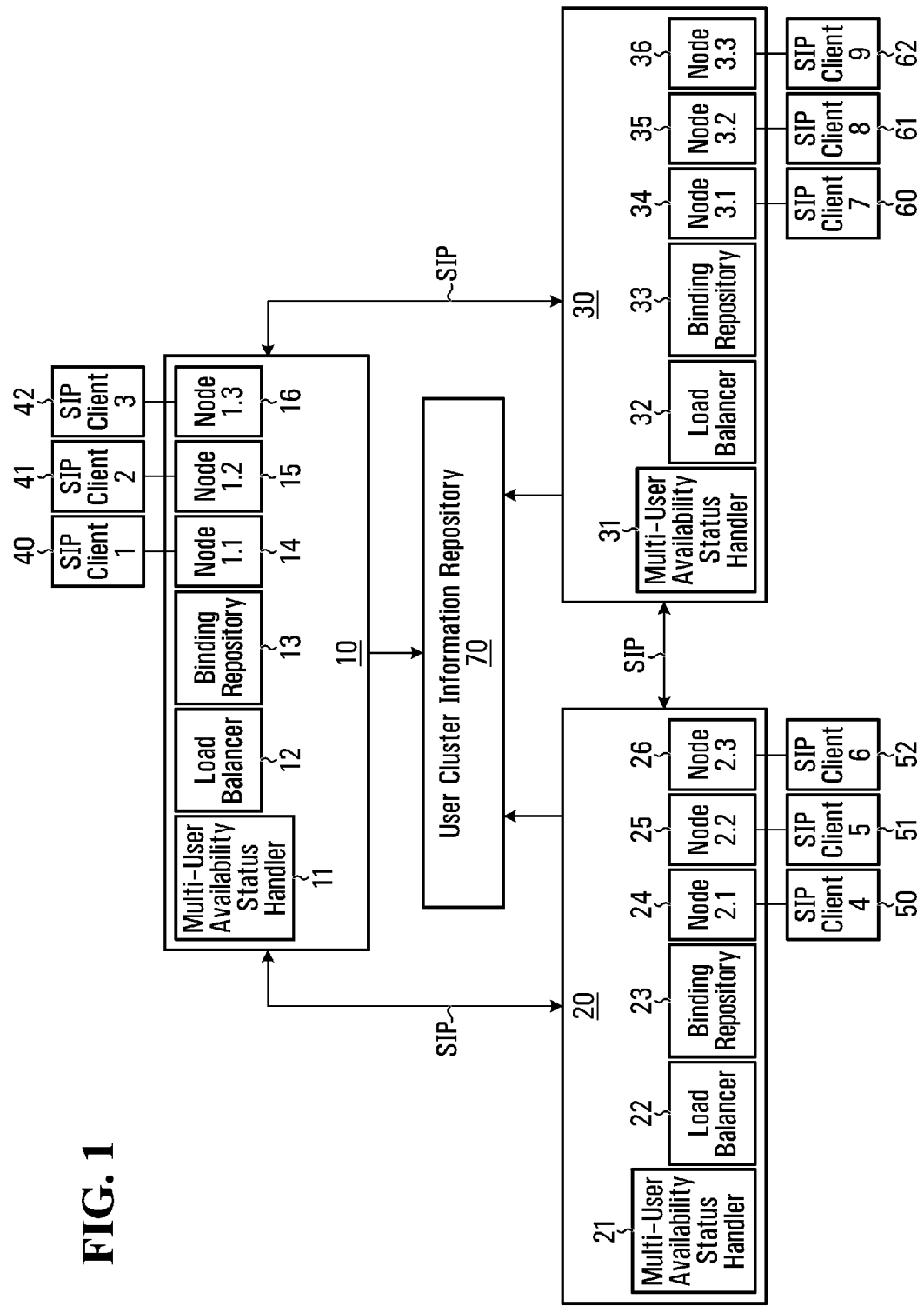
FIG. 1 is a schematic diagram of a SIP infrastructure.

Referring to FIG. 1, a SIP infrastructure provided by an embodiment of the application is implemented as a set of SIP clusters. In the example depicted there is a first SIP cluster 10, a second SIP cluster 20 and a third SIP cluster 30. SIP endpoints 40,41,42 are connected to the first SIP cluster. The connection is SIP connectivity; there may be one or more intervening networks between a given SIP endpoint and the first SIP cluster 10. Similarly, SIP endpoints 50,51,52 are connected (SIP connectivity) to the second SIP cluster 20, and SIP endpoints 60,61,62 are connected to the third SIP cluster 30. Each SIP endpoint comprises a device such as a mobile device, desktop or cordless SIP phone, soft SIP phone in combination with suitable hardware, to name a few examples, configured with SIP client functionality. The SIP infrastructure may include clusters that are co-located, clusters in different geographical areas, or both. The SIP clusters 10,20,30 are interconnected as shown, but there may be intervening networks. Also shown is a user cluster information repository 70 which contains a SIP cluster identifier for each of a plurality of user identifiers. The SIP cluster identifier for a given user identifier indicates a cluster to which a device associated with the user identifier was last connected, and is therefore probably still connected. In some embodiments, the SIP cluster identifier may, for example, be an address of the SIP cluster (such as an IP (Internet Protocol) address). In some embodiments, the SIP cluster identifier is any information that allows routing of a message to the SIP cluster. The user cluster information repository 70 is accessible by any SIP node of any SIP cluster. In some embodiments, the user cluster information repository 70 is implemented as part of a global database that is optimized for quick and efficient data retrieval. It may be capable of storing a large number of records.

Each SIP cluster contains a group of SIP nodes, some or all of which may, for example, be servers. In the illustrated example, the first cluster 10 has SIP nodes 14,15,16 the second cluster 20 has nodes 24,25,26 and the third cluster 30 has SIP nodes 34,35,36. The first SIP cluster 10 has a binding repository 13 and a multi-user availability status handler 11. The binding repository 13 may be on one of the SIP nodes 14,15,16, implemented in a distributed manner among two or more of the SIP nodes 14,15,16 or on a different device altogether. The binding repository 13 may, for example, be implemented as an in-memory database that is optimized for frequent retrievals, removals and updates. The binding repository 13 may, for example, contain information about currently active bindings. At the very least, the binding repository 13 contains availability status information for each SIP endpoint connected to a SIP node of that cluster. The information for each SIP endpoint also includes the associated user identifier.

In some embodiments, for a given SIP endpoint, "availability status information" is an actual availability status that constitutes an indication of whether the device is available or not. In some embodiments, availability status information=availability status and is one of "available", "unavailable", "unknown". What constitutes "available" can be defined on an implementation specific basis. In a specific example, one or a combination of the following constraints must be satisfied in order for a SIP endpoint to be considered available:

user device connected;
  user device registered;
  user device willing to receive call of a defined type, for example a media call; for example, the device should not be in a DND (do not disturb) mode;
  user device able to receive call—this may, for example require connectivity to exist over a transport that allows making a media call. For example, a connection may exist over a cellular data channel, but if the user (or carrier) does not allow calling over cellular data (only WiFi), then the device is not able to receive the call and is not "available"; in another example, a connection may be in place over 3G network, while calling is allowed only over 4G—again, the device is not "available".

Alternatively, the availability status information may be a more detailed set of information for the device, from which availability status can be discerned. For example, the availability status information may include one or a combination of:

whether or not the user device is connected;
  whether or not the user device is registered;
  whether or not the user device willing to receive call of a defined type, for example a media call; for example, the device should not be in a DND (don't disturb) mode;
  whether or not the user device able to receive a media call.
The availability status can then be determined based on the availability status information. In some embodiments, the availability status is determined based on the availability status information to be one of:

Unknown;
  Available;
  Unavailable.
The binding repository 13 is local to the SIP cluster 10 and accessible to all SIP nodes in the cluster. The multi-user availability status handler 11 may be implemented on one or more of the SIP nodes 14,15,16, or on a different device.

Similarly, the second SIP cluster 20 has a binding repository 23 and a multi-user availability status handler 21, and the third SIP cluster 30 has a binding repository 33 and a multi-user availability status handler 31.

Each SIP cluster 10,20,30 has an IP address to which requests, messages, method invocations etc. for the cluster are directed; this may, for example, be the IP address of a load balancer within the cluster. The first, second and third SIP clusters 10,20,30 are depicted with respective load balancers 12,22,32. A message or method invocation received by a load balancer is forwarded on to one of the SIP nodes in the associated SIP cluster. The load balancer of each cluster may be implemented on one of the nodes of the cluster or on a different device. In some embodiments, in one or more SIP clusters the multi-user availability status handler is implemented on the same device, for example a server, as the load balancer, but alternatively it can be implemented on a different device. The multi-user availability status handler may be replicated on all SIP nodes of the cluster.

It should be understood that the SIP infrastructure of FIG. 1 is a very specific example. There may be more or fewer SIP endpoints connected to each SIP cluster; there may be additional SIP clusters. The SIP clusters may have more or fewer SIP nodes. In addition, a SIP endpoint may over time be connected to different SIP clusters, for example due to mobility of the SIP endpoint.

Each user has a user identifier, also referred to as "address of record" in SIP terminology. In addition, each device has a device identifier. When a SIP endpoint connects to the SIP infrastructure, there is a procedure for selecting a SIP cluster. This may, for example, be based on domain name resolution in which case each SIP endpoint has a domain name of an outbound proxy, that resolves to an IP address, the IP address being that of a particular SIP cluster, for example the IP address of the load balancer of the SIP cluster as referred to above. The domain name resolution may be based on geographical location, such that the cluster selected is the closest to the particular SIP client node. Once SIP connectivity is in place, there is a connection between the SIP endpoint and one of the SIP nodes in the cluster.

To establish SIP connectivity, after TCP (transmission control protocol) connectivity is already in place (or some other underlying transport) SIP registration takes place. For security reasons, this is often performed using TLS (transport layer security) over a TCP connection between a SIP endpoint and a SIP infrastructure node. However, the SIP connectivity may be over different transports, for example TCP alone, or UDP (user datagram protocol).

As part of the SIP registration procedure, the SIP endpoint presents itself with a SIP register request which is authenticated, for example through the use of passwords and validation procedures. The completion of SIP registration results in an association between a specific address (for example a transport address, such as an IP address or an IP address and a port) and one or both of a user identifier and device identifier. Alternatively or in addition, an association is established between a connection identifier (which may be any identifier associated with the connection over which SIP signaling takes place; such a connection identifier may, for example, refer to a TCP socket file descriptor) and one or both of a user identifier and device identifier. For example, once a SIP endpoint such as SIP endpoint 40 connects to the first SIP cluster 10, there will be an association between the user identifier, device identifier and the connection. The information that associates the address and/or connection identifier with the user identifier and/or device identifier is stored in the binding repository 13 that is available to all of the SIP nodes in a given SIP cluster. SIP nodes in a different SIP cluster cannot query/change this information directly.

For the purpose of example, it is assumed that:

SIP endpoint 40 has user identifier USER_A, and device identifier DEVICE_A

SIP endpoint 41 has user identifier USER_B, and device identifier DEVICE_B

SIP endpoint 42 has user identifier USER_C, and device identifier DEVICE_C

SIP endpoint 50 has user identifier USER_A, and device identifier DEVICE_D

SIP endpoint 51 has user identifier USER_E, and device identifier DEVICE_E

SIP endpoint 52 has user identifier USER_F, and device identifier DEVICE_F

SIP endpoint 60 has user identifier USER_G, and device identifier DEVICE_G

SIP endpoint 61 has user identifier USER_H, and device identifier DEVICE_H

SIP endpoint 62 has user identifier USER_I, and device identifier DEVICE_I.

Here it can be seen that the user having user identifier USER_A has two devices with device identifiers DEVICE_A and DEVICE_D.

Based on the above example, the binding repository 13 for the first SIP cluster 10 would contain the following information:

USER_A, DEVICE_A, <connection identifier or address>
USER_B, DEVICE_B, <connection identifier or address>
USER_C, DEVICE_C, <connection identifier or address>

The binding repository 23 for the second SIP cluster 20 would contain the following information:

USER_A, DEVICE_D, <connection identifier or address>
USER_E, DEVICE_E, <connection identifier or address>
USER_F, DEVICE_F, <connection identifier or address>

The binding repository 33 for the second SIP cluster 30 would contain the following information:

USER_G, DEVICE_G, <connection identifier or address>
USER_H, DEVICE_H, <connection identifier or address>
USER_I, DEVICE_I, <connection identifier or address>

Furthermore, the user cluster information repository 70 would contain the following information:

USER_A: DEVICE_A, SIP cluster identifier of first SIP cluster
DEVICE_D, SIP cluster identifier of second SIP cluster
USER_B: DEVICE_B, SIP cluster identifier of first SIP cluster
USER_C: DEVICE_C, SIP cluster identifier of first SIP cluster
USER_E: DEVICE_E, SIP cluster identifier of second SIP cluster
USER_F: DEVICE_F, SIP cluster identifier of second SIP cluster
USER_G: DEVICE_G, SIP cluster identifier of third SIP cluster
USER_H: DEVICE_H, SIP cluster identifier of third SIP cluster
USER_I: DEVICE_I, SIP cluster identifier of third SIP cluster The system of FIG. 1 is configured to provide multi-user availability status regarding a specified set of users/identifiers. A multi-user availability status handler, such as multi-user availability status handler 11, in respect of obtaining availability status in respect of a plurality of user identifiers, for each user identifier of the plurality of user identifiers, looks up a respective SIP cluster identifier of a SIP cluster to which device(s) with that user identifier is/are currently connected or expected to be connected. In the illustrated example, this is achieved using the user cluster information repository 70. Next, the multi-user availability request handler groups the user identifiers into a plurality of groups according to SIP cluster identifier. Each group of user identifiers contains at least one user identifier for which the same SIP cluster identifier was obtained. Next, for each group, the multi-user availability status request handler sends a request in a single message for availability status to the respective SIP cluster of the group of user identifiers, the request containing the user identifiers that belong to the group of user identifiers. Such a message is sent to each other SIP cluster for which there is at least one user identifier for which availability status has been requested. For each such SIP cluster, this can, for example, be sent to the IP address of the cluster configured to receive SIP messages and method invocations etc. As indicated above, this may be the IP address of the load balancer of that cluster, and in turn this node may also include the multi-user availability status handler of that cluster. In any event, the request is forwarded on to the multi-user availability status handler if it is not co-located. The multi-user availability status handler of that cluster then looks up the availability status information for each user identifier in the list, in the binding repository of the cluster and responds to the multi-user availability status handler that sent the message.

In some embodiments, the method is initiated by a request from a SIP endpoint in which case it is a multi-user availability status handler of the cluster to which the SIP endpoint is connected that generates these messages for other SIP clusters. The multi-user availability status handler collects the responses, and generates a request which is forwarded to the SIP endpoint. In some embodiments, the method is initiated by a SIP infrastructure node in which case the results are forwarded to the SIP infrastructure node.

The following is a specific example. Assume that SIP endpoint 41 generates a request for availability status of the following list of user identifiers: USER_A, USER_C, USER_F. Such a request may come in the form of a JSON (JavaScript Object Notation) encoded list of users' addresses of record. This request is initially received by the SIP node 15 of the first cluster 10 to which the SIP endpoint 41 is connected, and then forwarded to the multi-user availability status handler 11. The multi-user availability status handler 11 obtains from the user cluster information repository 70 a SIP cluster identifier for each user identifier in the list of user identifiers and groups these by cluster. The multi-user availability status handler 11 learns the following:

First SIP cluster:
USER_A, DEVICE_A
USER_C, DEVICE_C
Second SIP cluster
USER_A, DEVICE_D
USER_F, DEVICE_F.

In some embodiments, cluster location is retrieved based on user identifier only; in other embodiments, cluster location is retrieved based on device identifier only; in other embodiments, the cluster location is retrieved based on user identifier and device identifier. Alternatively, a combination of two or more of these mechanisms may be implemented. The user cluster information repository will thus contain cluster information based on user identifier, device identifier, or both.

The availability status information for the devices connected to the first SIP cluster 10 can be obtained from the binding repository 13 of the first SIP cluster 10. A single message requesting availability status information for USER_A, DEVICE_D, USER_F, DEVICE_F is sent to the second SIP cluster 20 where it is handled by the multi-user availability status handler 21. This is consistent with the task of detecting availability of a specific user on a specific device provided for in some embodiments. In some embodiments, the task is to detect availability status of a specific user on any device, in which case device identifiers are not required. The multi-user availability status handler 21 looks up the requested availability status information in binding repository 23 of the second SIP cluster, and responds in a single message back to the first SIP cluster 10.

Next, the multi-user availability status handler 11 of SIP cluster 10 receives the response, and generates a response containing the requested availability status for SIP endpoint 41 that initiated the request. In some embodiments, where the availability status information contains the actual availability status, the availability status is simply forwarded to the SIP endpoint that initiated the request.

In some embodiments, the multi-user availability status handler 11 first processes the received availability status information to determine the availability status which is then forwarded to the SIP endpoint that initiated the request.

This can be implemented though a method invocation by the SIP endpoint on the SIP server using SIP signaling. Alternatively, or in addition, in some embodiments, the SIP server invokes the multi-user availability status handler method in the other SIP clusters, using SIP signaling. The method may be triggered by either an availability request from a SIP endpoint or by a SIP infrastructure node such as a server, for example by a software component of the server. In both cases, the method involves sending SIP messages to external clusters.

In some embodiments, the multi-user availability status handler 11 is configured to implement two methods that are invokable through SIP method invocation. The first method is a method that handles a request for multi-user availability status. Upon invocation, the method looks up the cluster to which each user is connected, and sorts the user identifiers by cluster, and invokes a second method on each cluster, collects responses to the second method, and provides a response to the SIP node that invoked the first method, which may be a SIP endpoint or an infrastructure node. The second method handles a request for availability status of one or more user identifiers connected to that cluster. Upon invocation, the second method obtains the availability status from the local binding repository, and a response is sent back to the SIP node that invoked the second method.

Assuming the first method is METHOD_1, and the second method is METHOD_2, the above example might be processed using method invocations such as the following.

The SIP entity that initiates the request (SIP endpoint or infrastructure node) performs the following:
Invoke SIP Method (Method_name=METHOD_1; address=first SIP cluster address; payload=USER_A, USER_C, USER_F).

The SIP entity upon which METHOD_1 is invoked performs the following:
Invoke SIP Method (Method_name=METHOD_2, address=second SIP cluster address; payload=USER_A, USER_F).

In another embodiment, the multi-user status handler 11 is configured to implement a method that is invokable through SIP method invocation. The argument to the method invocation is a list of user identifiers for which availability status is required.

In the event that at least some of the user identifiers are all connected to a cluster other than the same cluster as the node upon which the method is invoked, the user identifiers are sorted by cluster, and the same method is invoked on each cluster, but this time each invocation will only include user identifiers connected to that particular cluster. Responses are collected, and a response to the SIP node that invoked the method, which may be a SIP endpoint or an infrastructure node.

In the event the user identifiers are all connected to the same cluster as the node upon which the method is invoked, the information is obtained from the local binding repository, and a response is returned to the SIP entity that invoked the method.

Assuming the method is METHOD_1, the above example might be processed using method invocations such as the following.

The SIP entity that initiates the request (SIP endpoint or infrastructure node) performs the following:
Invoke SIP Method (Method_name=METHOD_1; address=first SIP cluster address; payload=USER_A, USER_C, USER_F).

The SIP entity upon which METHOD_1 is initially invoked performs the following:
Invoke SIP Method (Method_name=METHOD_1, address=second SIP cluster address; payload=USER_A, USER_F).

In a specific example, the request for availability status is in the form of a SIP invocation of a method and contains in its payload a JSON (JavaScript Object Notation) encoded list of user identifiers (e.g. Addresses of record).

Figure 2:
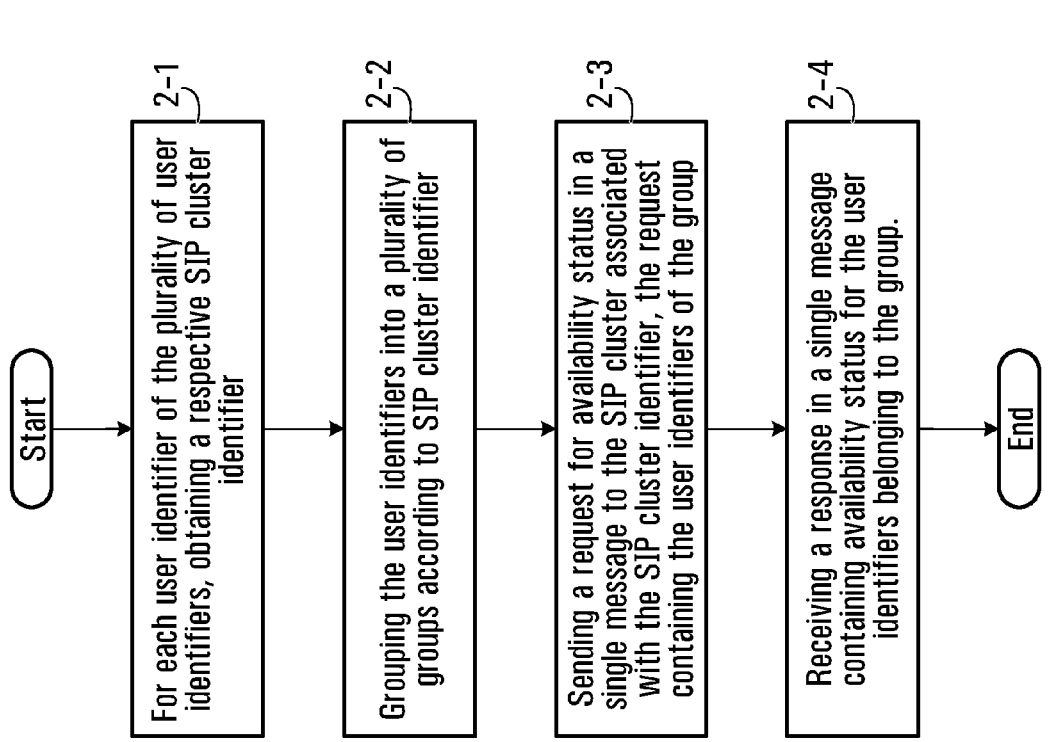
FIG. 2 is a flowchart of a method of obtaining availability status for multiple SIP users.

Referring now to FIG. 2, shown is a flowchart of a method of obtaining availability status in respect of a plurality of user identifiers. The method begins at block 2-1 with for each user identifier of the plurality of user identifiers, obtaining a respective SIP cluster identifier. The method continues in block 2-2 with grouping the user identifiers into a plurality of groups according to SIP cluster identifier. Each group of user identifiers contains at least one user identifier for which the same SIP cluster identifier was obtained. The method continues with, for each SIP cluster identifier for which there is a group of user identifiers, sending a request for availability status information in a single message to the SIP cluster, the request containing the user identifiers of the group of user identifiers (block 2-3, and receiving a response in a single message containing availability status information for the user identifiers belonging to the group of user identifiers (block 2-4).

In some embodiments, the method further involves receiving a request to obtain availability status in respect of the plurality of user identifiers.

In some embodiments, the request is received from a SIP node, which may be a SIP endpoint or an infrastructure node, the method further comprising sending a response to the SIP node containing the availability status for the user identifiers of the request.

In some embodiments, SIP method invocation is used to request availability status of the plurality of users. Alternatively, or in addition, in some embodiments, for each SIP cluster identifier for which there is a group of user identifiers, SIP method invocation is used to send a request for availability status in a single message to the SIP cluster associated with the SIP cluster identifier, the request containing the user identifiers of the group.

Another Mobile Device

Figure 3:
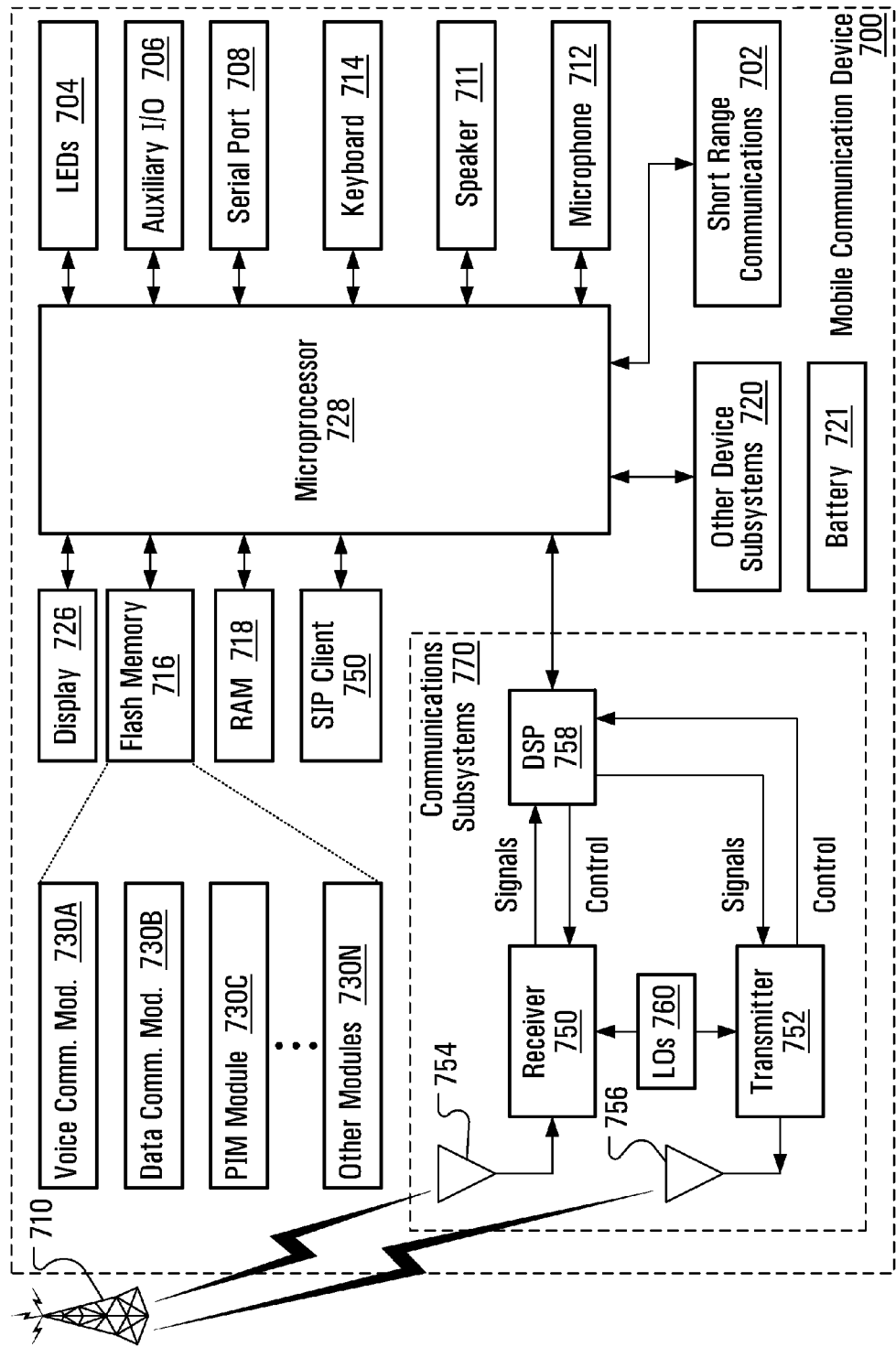
FIG. 3 is a block diagram of a mobile device.

Referring now to FIG. 3, shown is a block diagram of a mobile communication device 700 that may implement mobile device related methods described herein. It is to be understood that the mobile device 700 is shown with very specific details for example purposes only. The mobile device is an example of a SIP endpoint described above. Shown is a SIP client 780.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDs 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. In some embodiments, one or more parameters representative of unevenness in the signal constellation are stored in the non-volatile memory or in a volatile store. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless communications network 710 with the device user's corresponding data items stored or associated with a host computer system. As well, additional software modules, illustrated as other software module 730N, may be installed during manufacture.

Communication functions, including data and voice communications, are performed through the communications subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communications subsystem 770 also includes a processing module, such as a digital signal processor (DSP) 758, and local oscillators (LOs) 760. The specific design and implementation of the communications subsystem 770 is dependent upon the communication network in which the mobile device 700 is intended to operate. For example, the communications subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here may be multi-mode mobile devices, and as such they may include hardware and/or software for implementing at least two radio access technologies (RAT). More specifically, in a particular example, there would be a respective communications subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the wireless communication network 710. Signals received from the wireless communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the wireless communication network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communications subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem 702 may include an infrared device and associated circuits and components, or a Bluetooth™ communication module to provide for communication with similarly-enabled systems and devices.

The mobile device is a SIP endpoint, and has SIP client 780 configured thereon that generates requests for multi-user availability status using SIP method invocation.

Numerous modifications and variations of the present invention are possible in light of the above teachings. It is therefore to be understood that within the scope of the appended claims, the invention may be practiced otherwise than as specifically described herein.

We claim:

1. A method of obtaining availability status in respect of a plurality of user identifiers, the method comprising:
   for each user identifier of the plurality of user identifiers, obtaining a respective SIP cluster identifier from a user cluster information repository;
   grouping each user identifier into a plurality of groups of user identifiers according to the SIP cluster identifier obtained for each user identifier, each group of user identifiers is associated with a SIP cluster identifier such that the user identifiers of a group of user identifiers have the same obtained SIP cluster identifier;
   for each SIP cluster identifier for which there is a group of user identifiers:
      sending a request for availability status information in a single message to a SIP cluster associated with the SIP cluster identifier, the request containing the user identifiers of the group of user identifiers associated with the SIP cluster identifier;
      receiving a response in a single message from the SIP cluster associated with the SIP cluster identifier, the response containing availability status information for the user identifiers belonging to the group of user identifiers associated with the SIP cluster identifier;
   receiving a request to obtain availability status in respect of the plurality of user identifiers; and
   based on the received request to obtain availability status information, determining a respective availability status for each user identifier of the group of user identifiers associated with the SIP cluster identifier and responding to the request with the respective availability status for each user identifier of the group of user identifiers associated with the SIP cluster identifier.

2. The method of claim 1 wherein determining each availability status comprises determining the availability status to be one of available, unavailable and unknown.

3. The method of claim 1 wherein receiving the request to obtain availability status in respect of the plurality of user identifiers comprises receiving the request from a SIP node, the method further comprising sending a response to the SIP node containing the availability status for the user identifiers of the request.

4. The method of claim 3 wherein receiving the request from a SIP node comprises receiving the request from a SIP infrastructure node.

5. The method of claim 3 wherein receiving the request from a SIP node comprises receiving the request from a SIP endpoint.

6. The method of claim 1 wherein:
   receiving the request comprises SIP method invocation.

7. The method of claim 1 wherein:
   for each SIP cluster identifier for which there is a group of user identifiers, sending the request for availability status information in the single message to the SIP cluster associated with the SIP cluster identifier, the request containing the user identifiers of the group comprises using SIP method invocation.

8. A SIP node comprising:
   a multi-user availability status handler configured to, in respect of obtaining availability status in respect of a plurality of user identifiers:
   for each user identifier of the plurality of user identifiers, obtain a respective SIP cluster identifier;
   group each user identifier into a plurality of groups of user identifiers according to the SIP cluster identifier obtained for each user identifier, each group of user identifiers is associated with a SIP cluster identifier such that the user identifiers of a group of user identifiers have the same obtained SIP cluster identifier;
   for each SIP cluster identifier for which there is a group of user identifiers:
      send a request for availability status information in a single message to a SIP cluster associated with the SIP cluster identifier, the request containing the user identifiers of the group of user identifiers associated with the SIP cluster identifier;
      receive a response in a single message from the SIP cluster associated with the SIP cluster identifier, the response containing availability status information for the user identifiers belonging to the group of user identifiers associated with the SIP cluster identifier;
   receive a request to obtain availability status in respect of the plurality of user identifiers; and
   based on the received request to obtain availability status information, determine a respective availability status for each user identifier of the group of user identifiers associated with the SIP cluster identifier and respond to the request with the respective availability status for each user identifier of the group of user identifiers associated with the SIP cluster identifier.

9. A system comprising:
   a plurality of SIP nodes that are interconnected with SIP connectivity, the plurality of nodes being arranged in at least two SIP clusters, each SIP cluster having:
      a local binding repository containing availability status information for each user identifier for which there is a SIP endpoint connected to a SIP node within the SIP cluster; and
   a respective multi-user availability status handler;
   a user cluster information repository indicating a respective SIP cluster identifier of a SIP cluster to which a SIP endpoint of each of a plurality of user identifiers is expected to be connected;

wherein each multi-user availability status handler is configured to, in respect of obtaining availability status in respect of a plurality of user identifiers:
for each user identifier of the plurality of user identifiers, obtain a respective SIP cluster identifier from the user cluster information repository;
group each user identifier into a plurality of groups of user identifiers according to the SIP cluster identifier obtained for each user identifier, each group of user identifiers is associated with a SIP cluster identifier such that the user identifiers of a group of user identifiers have the same obtained SIP cluster identifier;
for each SIP cluster identifier for which there is a group of user identifiers:
send a request for availability status information in a single message to the SIP cluster associated with the SIP cluster identifier, the request containing the user identifiers of the group of identifiers associated with the SIP cluster identifier;
receive a response in a single message from the SIP cluster associated with the SIP cluster identifier, the response containing availability status information for the user identifiers belonging to the group of user identifiers associated with the SIP cluster identifier
receive a request to obtain availability status in respect of the plurality of user identifiers from a SIP node; and
based on the received request to obtain availability status information, determine a respective availability status for each user identifier of the group of user identifiers associated with the SIP cluster identifier and send a response to the SIP node with the respective availability status for each user identifier of the group of user identifiers associated with the SIP cluster identifier.

10. The system of claim 9 wherein:
SIP method invocation is used to request availability status of the plurality of users;
for each SIP cluster identifier for which there is a group of user identifiers, SIP method invocation is used to send a request for availability status information in a single message to the SIP cluster associated with the SIP cluster identifier, the request containing the user identifiers of the group.

11. The system of claim 9 wherein each multi-user availability status handler is further configured to:
based on the received response for each SIP cluster identifier for which there is a group of user identifiers, determine a respective availability status for each user identifier and respond to the request with the respective availability status for each user.

12. The system of claim 11 wherein availability status comprising one of available, unavailable and unknown.

13. A non-transitory-computer readable storage medium having computer executable instructions stored thereon for obtaining availability status in respect of a plurality of user identifiers, the computer executable instructions comprising instructions for:
for each user identifier of a plurality of user identifiers, obtaining a respective SIP cluster identifier;
grouping each user identifier into a plurality of groups of user identifiers according to the SIP cluster identifier obtained for each user identifier, each group of user identifiers is associated with a SIP cluster identifier such that the user identifiers of a group of user identifiers have the same obtained SIP cluster identifier;
for each SIP cluster identifier for which there is a group of user identifiers:
sending a request for availability status information in a single message to a SIP cluster associated with the SIP cluster identifier, the request containing the user identifiers of the group of user identifiers associated with the SIP cluster identifier;
receiving a response in a single message from the SIP cluster associated with the SIP cluster identifier, the response containing availability status information for the user identifiers belonging to the group of user identifiers associated with the SIP cluster identifier;
receiving a request to obtain availability status in respect of the plurality of user identifiers; and
based on the received request to obtain availability status information, determining a respective availability status for each user identifier of the group of user identifiers associated with the SIP cluster identifier and responding to the request with the respective availability status for each user identifier of the group of user identifiers associated with the SIP cluster identifier.

14. The non-transitory computer readable storage medium of claim 13 wherein determining each availability status comprises determining the availability status to be one of available, unavailable and unknown.

* * * * *